US007138357B2

(12) United States Patent
Karvinen et al.

(10) Patent No.: US 7,138,357 B2
(45) Date of Patent: Nov. 21, 2006

(54) PHOTOCATALYST CONTAINING TITANIUM OXIDE, THE PRODUCTION METHOD AND USE OF THE SAME

(75) Inventors: Saila Marjatta Karvinen, Pori (FI); Ralf-Johan Lamminmäki, Ulvila (FI)

(73) Assignee: Kemira Pigments Oy, Helsinki (FI)

( * ) Notice: Subject to any disclaimer, the term of this patent is extended or adjusted under 35 U.S.C. 154(b) by 0 days.

(21) Appl. No.: 10/509,854

(22) PCT Filed: Apr. 1, 2003

(86) PCT No.: PCT/FI03/00251

§ 371 (c)(1), (2), (4) Date: Sep. 30, 2004

(87) PCT Pub. No.: WO03/082743

PCT Pub. Date: Oct. 9, 2003

(65) Prior Publication Data

US 2005/0181937 A1 Aug. 18, 2005

(30) Foreign Application Priority Data

Apr. 2, 2002 (FI) .................................. 20020624

(51) Int. Cl.
*B01J 27/02* (2006.01)
*B01J 27/047* (2006.01)
*B01J 23/00* (2006.01)
*C01G 23/02* (2006.01)
*C01G 23/047* (2006.01)

(52) U.S. Cl. ............ 502/216; 502/219; 502/221; 502/223; 502/350; 423/82; 423/85; 423/610; 423/616

(58) Field of Classification Search .......... 502/216, 502/350, 219, 221, 223; 423/82, 85, 610, 423/616
See application file for complete search history.

(56) References Cited

U.S. PATENT DOCUMENTS

| 2,344,265 | A | * | 3/1944 | Piechner et al. | ......... 423/615 |
| 3,341,291 | A | * | 9/1967 | Barnard et al. | ........... 423/85 |
| 3,533,742 | A | * | 10/1970 | Felix | ................. 423/83 |
| 4,012,338 | A | * | 3/1977 | Urwin | ................ 502/350 |
| 4,098,869 | A | * | 7/1978 | Paolinelli et al. | ......... 423/85 |
| 4,923,682 | A | * | 5/1990 | Roberts et al. | ........... 423/611 |
| 5,030,439 | A | * | 7/1991 | Brownbridge | ........... 423/610 |
| 5,527,469 | A | * | 6/1996 | Lawhorne et al. | ..... 210/710 |
| 6,306,361 | B1 | * | 10/2001 | Shin et al. | ............. 423/610 |
| 2004/0092393 | A1 | * | 5/2004 | Bygott et al. | .......... 502/350 |

FOREIGN PATENT DOCUMENTS

| DE | 3439217 A1 | 4/1986 |
| EP | 0 675 086 A2 | 10/1995 |
| EP | 0 924 164 A2 | 6/1999 |
| EP | 1 138 634 A1 | 10/2001 |
| EP | 1 174 392 A1 | 1/2002 |
| JP | 10-230169 A | 9/1998 |
| JP | 2002-029750 A | 1/2002 |
| WO | 93/43616 | 9/1999 |

OTHER PUBLICATIONS

Jalava, J. et al., "Structural Investigation of Hydrous Titanium Dioxide Precipitates and Their Formation by Small-angle X-ray Scattering", Ind. Eng. Chem. Res., vol. 39, pp. 349-361, (2000). Jan. 2000.
Asahi, R. et al., "Visible-Light Photocatalysis in Nitrogen-Doped titanium Oxides", Science, vol. 293, pp. 269-271, (2001), no month available.
Muggli, D.S., et al., "Photocatalytic performance of sulfated $TiO_2$ and Degussa p. 25 $TiO_2$ during oxidation of organics", Applied Catalysis B: Environmental, vol. 32, pp. 181-194, (2001), Jan. 2001.
Elvers, B., et al. (Ed) . Ullmann's Encyclopedia of Industrial Chemistry, 5th Ed., vol. A20, "Photography to Plastics, Processing", pp. 276-278, (1992), no month available.
Yamazaki, S. et al., "Effect of sulfate ions for sol-gel synthesis of titania photocatalyst", Applied Catalysis A: General, vol. 210, pp. 94-102, (2001), no month available.

* cited by examiner

Primary Examiner—J. A. Lorengo
Assistant Examiner—Patricia L. Hailey
(74) Attorney, Agent, or Firm—Nath & Associates PLLC; Gary M. Nath; Tanya E. Harkins

(57) ABSTRACT

The invention relates to a photocatalyst containing titanium dioxide, to a method for using it and to its application. A sulphurous titanium dioxide hydrate precipitate is precipitated from an acid titanium oxysulphate solution at a temperature below the boiling point of the solution, e.g. in the range from 70 to 100° C., using crystal nuclei and without addition of base. The precipitate is separated, washed and calcinated. The photocatalytic titanium dioxide thus obtained has a specific area in the range from 100 to 250 $m^2/g$ and a 0.3 to 5% sulphur concentration. Catalytic activity has been confirmed in asetal dehyde decomposition and in anionic $(SNC^-)_2$ radical formation.

12 Claims, No Drawings

PHOTOCATALYST CONTAINING TITANIUM OXIDE, THE PRODUCTION METHOD AND USE OF THE SAME

The invention relates to a method for preparing a photocatalyst containing titanium dioxide, the photocatalyst prepared by this method and the use of the photocatalyst thus obtained.

Titanium dioxide, of which the major production portion is used as a pigment, is prepared by the "sulphate method", in which an ilmenite concentrate is reacted with sulphuric acid at high temperature, and iron is separated from the obtained solution by precipitating in the form of ferrosulphate. The remaining acid titanium oxide sulphate solution is concentrated and heated to its boiling temperature, at which titanium is precipitated in the form of metatitanic acid. The precipitate is separated and transformed into titanium dioxide by calcination at a temperature of about 900° C.

In an optional method for preparing titanium dioxide, titanium brine is neutralised at ambient temperature by addition of alkaline or ammonium hydroxide, and then titanium precipitates as orthotitanic acid. DE patent specification 3 439 217 describes partial neutralisation, in which aminor portion of the concentrated titanium sulphate solution is first combined with alkali at 85 to 90° C., and this partial solution is subsequently added to a titanium sulphate solution at a temperature of 85° C., which is then heated to the boiling point, at which titanium is precipitated.

Precipitation under various conditions of titanium dioxide hydrates included in pigment production has been studied in Jalava et al., Ind. Eng. Chem. Res. 2000, 39, pages 349 to 361. In addition to precipitation in the sulphate method and base precipitation from a titanium chloride solution, the authors examine precipitation at temperatures of 70° C. and 90° C., with an aqueous solution prepared from titanyl sulphate as the material. The result was either metatitanic acid or orthotitanic acid, which were produced in the solution as the primary particles originally present in the solution adhered to each other, forming aggregates, which then joined into larger particles. The temperature increase and the low concentration of the solution were observed to foster orthotitanic acid production. However, precipitation was slow and yields low due to the fact that titanium in ionic form precipitated only with a delay.

Besides the use as a pigment, the aptitude of titanium dioxide as a photocatalyst has also been widely studied. The development of a photocatalyst acting in the area of visible light has been an objective for chemists for many years. They have aimed at a $TiO_2$ catalyst operating with solar energy, which would oxidise water or air pollutions. Usually titanium dioxide in anatase form absorbs solar radiation at wavelengths under 390 nm, whereby the electron excitation contributes to the formation of oxygen or hydroxy radicals. Radicals, in turn decompose aldehydes, $NO_x$ gases and organic solvents. The advantages of titanium dioxide when used as a catalyst include chemical inertia and atoxity, yet involving the drawback that with both the crystal forms of titanium dioxide, anatase and rutile, the energy difference between various electron excitation states (band gap) is approx. 3 eV, the corresponding photon being in the UV area beyond visible light. This is why there have been attempts to transform titanium dioxide so as to make it operate also in the area of visible light at wavelengths above 400 nm.

So far, titanium dioxide intended as a photocatalyst has mostly been produced from titanium tetrachloride either in the gaseous phase or from a solution by precipitation with a base. Precipitation as orthotitanic acid produces a large specific area in the final calcinated titanium dioxide, this area being favourable in terms of catalytic activity. Modification of the catalyst so as to make it functional in the area of visible light has been attempted by using various additives. Thus, for instance, catalysts have been doped with various metals, such as iron, chromium or cobalt, which have been impregnated in titanium dioxide hydrate precipitate before calcination of this. Asahi et al., SCIENCE 293 (2001), pages 269 to 271, have doped $TiO_2$ with nitrogen using sputtering technique and tested the resulting product by decomposing gaseous acetal dehyde. In EP patent specification 1138 634 A1, photocatalytic activity of visible light has been sought with the use of ammonia gas. In this patent specification, calcination of titanium hydroxide in air without ammonia treatment yields poor activity in visible light. Muggli et al., Applied Catalysis B: Environmental 32, 2001, pages 181–194, managed to increase the specific area of titanium dioxide photocatalysts and their activity in specific conditions by adding sulphate ions before calcination.

EP patent specification 1 174 392 describes the production of photocatalytic titanium dioxide starting from a titanium oxysulphate solution, which has first been evaporated as solid titanium oxysulphate. This has subsequently been reacted with ammonia, eventually followed by calcination. A gas that was supposed to be nitrogen and sulphuric dioxide separated from the obtained titanium dioxide at high temperature.

Other known ways of regulating the specific area and other properties of titanium dioxide photocatalysts comprise regulation of the precipitation and calcination temperatures and other production conditions of titanium hydrate. There have also been attempts to increase the photoactivity of titanium dioxide by reducing part of the titanium to trivalent titanium. However, this involves the problem of the instability of trivalent titanium, its tendency to reoxidise to tetravalent titanium.

The purpose of the present invention is to provide a new method for preparing titanium dioxide photocatalysts, which eliminates the prior art problems mentioned above while producing a catalyst having increased activity in the area of visible light. The production of titanium dioxide in accordance with the invention is characterised in that from an acid solution containing titanium oxysulphate at a temperature under the boiling point of the solution is precipitated by addition of chrystal nuclei a sulphurous titanium dioxide hydrate precipitate, said precipitate being separated and subsequently subjected to thermal treatment in order to obtain a crystalline sulphurous product.

A suitable reactant of the method of the invention comprises acid titanium oxysulphate solution obtained from sulphuric acid dissolution of ilmenite, at least the major portion of iron having been removed from the solution. The invention can thus be simply carried out by following an industrial sulphate process known per se, excepting that the precipitation temperature is lower than the one used in the sulphate process, below the boiling point of the solution. The precipitation step of the method has very high yield and separation of the precipitate from the liquid phase is easy. Calcination can be performed in air at a relatively low temperature without the ammonia treatment required in prior art. The calcinated end product is stable, and it has been stated to have an excellent photocatalytic effect at visible light wavelengths in different reactions. Higher activity in acetal dehyde decomposition and formation of $(SCN^-)_2$ anion radical than previous titanium dioxide photocatalysts have been determined for the product, the reactions having been used in the preliminary testing of the invention.

The sulphur obtained in the product in accordance with the invention is based on precipitation from the sulphate solution conducted in acid conditions. Besides the presence of sulphur, the observed high catalytic activity may relate to the precipitation of titanium as orthotitanic acid. The precipitate has been confirmed to dissolve into 43% sulphuric acid at a temperature of 60 °C. forming a 22% $TiO_2$ solution. Orthotitanic acid produces a large specific area in the product, which is favourable in terms of photocatalytic activity. However, we stress that these assumptions are not by any means intended as a restriction of the invention.

As precipitation is activated in the method of the invention by means of crystal nuclei added as seed to the solution, it is not necessary to change the pH of the solution in the precipitation phase. In other words, the method operates without base addition, which is a substantial difference from previous methods of precipitating titanium dioxide.

The advantageous precipitation temperature range in accordance with the invention is 70 to 100° C. Tests showed that the most active catalyst had precipitated at a temperature of 80° C. When the precipitation temperature increases above this, results indicate that the catalytic activity starts decreasing.

The crystal nuclei used as precipitation seed, which may have a size of a few nanometres, are most preferably anatase. With anatase seeding the final calcinated titanium dioxide is also in anatase form, which is a more active catalyst than rutile.

Calcination of the hydrate precipitate is conducted in the temperature range 100 to 500° C., most preferably in the temperature range 200 to 500° C. The catalytic activity has been observed to decrease above and under this calcinations temperature range.

The activity of the titanium dioxide photocatalyst prepared in accordance with the invention may be enhanced under the action of iron or chromium present in the catalyst. If the precipitating solution containing titanium oxide sulphate is prepared by the sulphate method, ferric iron can be left in the solution so as to precipitate as hydroxide along with titanium. Chromium may be added as a doping agent to the precipitate, and the amount of iron can also be increased by means of doping. Results show that trivalent chromium and iron have an enhancing action on catalysis especially at visible light wavelengths above 420 nm and particularly when they are simultaneously present in the catalyst.

The photocatalyst containing titanium dioxide of the invention is characterised by the crystalline particulate product having a specific area of 100 to 250 $m^2/g$ and of the product containing 0.3 to 5% of sulphur, preferably 0.5 to 4%, and most preferably 1 to 4%. The titanium dioxide is most preferably in anatase form, and besides sulphur, the product may contain chromium, advantageously 0.05 to 2% and most preferably 0.1 to 1%, and iron, preferably 0.05 to 3% and most preferably 0.1 to 1.5%. The photocatalyst of the invention can be prepared as in the description of the method given above.

The use of the titanium dioxide of the invention described above or prepared by the method explained above comprises generally decomposition of organic compounds or microorganisms at wavelengths in the visible light area of photocatalysation. In accordance with the invention, the catalyst may be used mixed in the binder in a honeycomb catalytic structure and in coating compositions for various purposes, such as self-purifying surfaces, car paints, glass, lamp and shade surfaces and anti-fogging coatings.

The invention is explained in greater detail below by means of embodiment examples illustrating the preparation of a photocatalyst and by the results obtained with these catalysts.

EXAMPLE 1

An ilmenite concentrate and sulphuric acid were allowed to react mutually at high temperature. After this, the metal sulphates formed were dissolved in diluted sulphuric acid. The insoluble residue was filtered separately. The ferric iron of the solution was reduced into ferrous form and part of the iron was removed by crystallisation in the form of ferrosulphate by cooling the solution.

Measured at 60° C., the main components of the solution thus formed were 18% of sulphuric acid, 9.5% of titanium dioxide and 3.6% of iron ($Fe^{2+}$). 9800 g of this solution was placed in a precipitation flask into a water bath at a temperature of 70 °C., where it was stirred. To activate precipitation, 3% of nuclei in anatase form were added to the solution and the titanium hydrate precipitate was further separated by precipitation for 20.5 hours. The precipitation yield was then 93.8%.

The precipitate was filtered and washed with water (2 $dm^2$ of water/350 g $TiO_2$). The titanium hydrate precipitate was calcinated at a temperature of 300° C. for 4 hours.

The sample had a specific area of 187 $m^2/g$.

EXAMPLE 2

The procedure was the same as in example 1, but the titanium hydrate precipitate was calcinated at a temperature of 400° C. for 4 hours.

EXAMPLE 3

The procedure was the same as in example 1, but the titanium hydrate precipitate was calcinated at a temperature of 500° C. for 4 hours.

EXAMPLE 4

The procedure was the same as in example 1, but the titanium hydrate precipitate was calcinated at a temperature of 600° C. for 4 hours.

EXAMPLE 5

The procedure was the same as in example 1, but the titanium hydrate precipitate was calcinated at a temperature of 200° C. for 4 hours.

EXAMPLE 6

9800 g of the solution used in example 1 was placed in a precipitation flask into a water bath at a temperature of 80° C., where it was stirred. To activate precipitation, 3% of nuclei in anatase form were added to the solution and the titanium hydrate precipitate was separated by precipitation for 5 hours. The precipitation yield was then 93.2%.

The precipitate was washed with water (2 $dm^3$ of water/350 g of $TiO_2$). The titanium hydrate precipitate was calcinated at a temperature of 300° C. for 4 hours.

EXAMPLE 7

The mass that had been precipitated, filtered and washed in example 1 was dissolved in concentrated sulphuric acid, and water was added to the solution to a sulphuric acid concentration of 31.7% measured at 60° C. and a titanium dioxide concentration of 239 g/dm$^3$. 1225 g of this solution was placed in a precipitation flask in a water bath at a temperature of 70° C., where it was stirred. To activate precipitation, 3% of nuclei in anatase form were added to the solution and the titanium hydrate precipitate was separated by precipitation for 20 hours. The precipitation yield was then 96.7%.

The precipitate was washed with water (2 dm$^3$ of water/ 350 g of TiO$_2$). The titanium hydrate precipitate was calcinated at a temperature of 300° C. for 4 hours.

EXAMPLE 8

7022 g of the solution used in example 1 was placed in a precipitation flask in a water bath at a temperature of 90° C., where it was stirred. To activate precipitation, 3% of nuclei in anatase form were added to the solution and the titanium hydrate precipitate was separated by precipitation for 3 hours. The precipitation yield was then 93.1%.

The precipitate was washed with water (6 dm$^3$ of water/ 350 g of TiO$_2$). The titanium hydrate precipitate was calcinated at a temperature of 300° C. for 4 hours.

EXAMPLE 9

7015 g of the solution used in example 1 was placed in a precipitation flask into a water bath at a temperature of 100° C., where it was stirred. To activate precipitation, 3% of nuclei in anatase form were added to the solution and the titanium hydrate precipitate was separated by precipitation for 2 hours. The precipitation yield was then 94.5%.

The precipitate was washed with water (6 dm$^3$ of water/ 350 g of TiO$_2$). The titanium hydrate precipitate was calcinated at a temperature of 300° C. for 4 hours.

EXAMPLE 10

An ilmenite concentrate and sulphuric acid were allowed to react at high temperature. After this, the metal sulphates formed were dissolved in diluted sulphuric acid. The insoluble residue was filtrated separately. Part of the ferric iron of the solution was removed by crystallisation.

Measured at 60° C., the main components of the solution thus formed were 21.3% of sulphuric acid, 8.6% of titanium dioxide and 2.5 of iron. 9495 g of this solution was placed in a precipitation flask in a water bath at a temperature of 70° C., where it was stirred. To activate precipitation, 3% of nuclei in anatase form were added to the solution and the titanium hydrate precipitate was separated by precipitation for 20.5 hours. The precipitation yield was then 93.8%.

The precipitate was filtered and washed with water (2 dm$^2$ of water/212 g of TiO$_2$).

The titanium hydrate precipitate was calcinated at a temperature of 300° C. for 2 hours.

EXAMPLE 11

100 g of the titanium dioxide hydrate mass obtained by filtering and washing as in example 10 was mixed with 1.25 ml of a CrCl$_3$ solution having a concentration of 115 g/l.

The mixture was calcinated at 300° C. for 2 hours.

EXAMPLE 12

100 g of the titanium dioxide hydrate mass obtained by filtering and washing as in example 10 was mixed with 5 ml of aVCl$_3$ solution having a concentration of 118 µl.

The mixture was calcinated at 300° C. for 2 hours.

EXAMPLE 13

100 g of the titanium dioxide hydrate mass obtained by filtering and washing as in example 10 was mixed with 0.25 ml of an NbCl$_5$ solution having a concentration of 40 g/l.

The mixture was calcinated at 300° C. for 2 hours.

EXAMPLE 14

100 g of the titanium dioxide hydrate mass obtained by filtering and washing as in example 1 was mixed with 5 ml of a CrCl$_3$ solution having a concentration of 115 g/l. When the chromium and iron concentrations were analysed, part of the iron contained in the solution was observed to be oxidised and mixed with this precipitation mass. A 1.0% Cr concentration and a 0.1% Fe concentration were analysed.

The mixture was calcinated at 300° C. for 2 hours.

EXAMPLE 15

100 g of the titanium dioxide hydrate mass obtained by filtering and washing as in example 1 was mixed with 11.3 ml of a Cr(SO$_4$)$_3$ solution having a concentration of 10.4 g/l. Ferrosulphate was additionally added so as to get a Cr concentration of 0.16% and a Fe concentration of 1.5%.

The mixture was calcinated at a temperature of 300° C. for 2 hours.

EXAMPLE 16

100 g of the titanium dioxide hydrate mass obtained by filtering and washing in abundant water as in example 6 was mixed with 2.2 ml of a CrCl$_3$ solution having a concentration of 115 g/l. the titanium dioxide had a Cr concentration of 0.48%.

The mixture was calcinated at 300° C. for 1.5 hours.

EXAMPLE 17

Ammonia was added to 200 g of the titanium dioxide hydrate mass obtained by filtering and washing with abundant water as in example 6 at ambient temperature for pH regulation to 6.5. After neutralisation, the precipitate was carefully washed with water in order to remove ammonia sulphate. Then 30 g of titanium oxide hydrate mass neutralised to pH 6.5 was mixed with 3.7 ml of a Cr$_2$(SO$_4$)$_3$ solution (8.0 g of Cr/l). 0.22 ml of ferrisulphate solution was added to this (148 g of Fe/l) and the mixture was calcinated at a temperature of 200° C. for 2 hours.

EXAMPLE 18

90 g of the titanium dioxide hydrate mass obtained by filtering and washing as in example 8 was mixed with 7.8 ml of a Cr$_2$(SO$_4$)$_3$ solution having a concentration of 8.4 g/l. 4.6 ml of a ferrisulphate solution (15.5 fg of Fe/l) was added and the mixture was calcinated at 100° C. for 6 hours.

EXAMPLE 19 (COMPARATIVE)

The concentrated solution used in example 7 was diluted with water so as to get a sulphuric acid concentration of 20.1% and a titanium dioxide concentration of 129 g/l. 100 ml of this titanium sulphate solution was added to 100 ml of a 20% ammonia solution from a dropping funnel at low temperature, whereby titanium hydrate precipitated. At the end of the addition, the pH was 8.7. The mixture was boiled for 1 hour at 70° C.

The precipitate was washed with water and calcinated at a temperature of 300° C. for 2 hours.

EXAMPLE 20 (COMPARATIVE)

The reactant was a titanium dioxide chloride solution ($TiOCl_2$), which was diluted with water to a content of 40 g/dm$^3$ of $TiO_2$ and 80 g/dm$^3$ of HCl. 0.594 dm$^3$ of this solution was placed in a precipitation flask into a water bath at a temperature of 70° C., where it was stirred and titanium hydrate precipitated.

The precipitate was washed with water (2 dm$^3$ of water/ 350 g of $TiO_2$). The titanium hydrate precipitate was calcinated at 300° C. for 3 hours.

EXAMPLE 21 (COMPARATIVE)

The comparative substance comprised a commercial product of anatase type FINNTi S 140. The sample had a specific area of about 250 m$^2$/g.

EXAMPLE 22 (COMPARATIVE)

The comparative substance comprised a commercial product of anatase type (approx. 30% of rutile) Degussa 25. The sample had a specific area of about 50 m$^2$/g.

EXAMPLE 23

A photocatalytic dispersion was prepared by mixing 240 g of the product of example 1, 180 g of water, 18 g of the product Disperbyk 190 (Byk-Chemie) and 6 g of the product Foamaster VL (Henkel-Nopco). Water, Byk 190 and Foamaster were first weighed into a beaker. Then the product of example 1 was added gradually during the dissolver mixing (5 minutes). Finally the mixture was dispersed in a bead mill for 20 min.

Photoactivity Measurements

1. Asetal Dehyde Oxidation

The photoactivity of titanium oxides of examples 1 to 18 in the visible light area was determined using the titanium oxides as photocatalysts in asetal dehyde oxidation in a 0.5 liter reactor. In two measurement sets the light source was a 150 W xenon lamp, whose UV light was filtered off with 400 nm and 420 nm light filters. The asetal dehyde concentration was determined by gas chromatography comprising a FID detector (Hewlett Packard 5890). The rate of asetal dehyde decomposition in the system was calculated for 2 hours: decrease in the peak area/120 min. The angular coefficient was determined by means of linear regression. The results are shown in the following table.

TABLE

| | Sulphur concentr./% | Fe concentr. ppm | Cr concentr. ppm | Specific area m$^2$/g | Photoactivity Filter 400 nm Area/min | Photoactivity filter 420 nm Area/min |
|---|---|---|---|---|---|---|
| Example 1 | 2.6 | 34 | 10 | 187 | 1530 | 540 |
| Example 2 | 2.5 | 34 | 10 | 126 | 1800 | 440 |
| Example 3 | 2.4 | 34 | 10 | 95 | 1340 | 410 |
| Example 4 | 1.3 | 34 | 10 | 54 | 244 | |
| Example 5 | 3.0 | 34 | 10 | 244 | 1540 | 280 |
| Example 6 | 3.2 | 27 | 17 | 165 | 2500 | 600 |
| Example 7 | 2.9 | 16 | 2 | 212 | 1470 | 380 |
| Example 8 | 1.7 | 20 | 18 | 166 | 2460 | 406 |
| Example 9 | 1.8 | 18 | 16 | 179 | 940 | |
| Example 10 | 3.9 | 5100 | 4 | 103 | 1360 | 814 |
| Example 11 | 4.2 | 5100 | 4500 | 172 | 1800 | 1600 |
| Example 12 | 3.9 | 5100 | 4 | 215 | 200 | |
| Example 13 | 3.9 | 5100 | 4 | 223 | 400 | |
| Example 14 | 3.9 | 1000 | 10000 | 172 | 1840 | 1470 |
| Example 15 | 3.8 | 15000 | 1600 | 170 | 2700 | 2430 |
| Example 16 | 3.3 | 9 | 4800 | 201 | 1470 | 1340 |
| Example 17 | 0.5 | 2300 | 1700 | 202 | 1840 | |
| Example 18 | 2.7 | 1160 | 1900 | 259 | 3300 | |
| Example 19 | 0 | | | 116 | 0 | 0 |
| Example 20 | 0 | | | 38 | 290 | |
| Example 21 | <0.3 | | | 250 | 60 | |
| Example 22 | 0 | | | 50 | 295 | 70 |

The photoactivity of the product in example 15 was also measured using an ordinary fluorescent work lamp without light filter instead of a xenon lamp. The area/min. measured was 1060.

2. $(SNC^-)_2$ Anion Radical Formation

The photoactivity of the titanium dioxides obtained was tested by catalysing the formation of anionic $(SNC^-)_2$ radical with the titanium dioxides in a potassium thiocyanate solution. 50 g/l of titanium dioxide was dispersed in a 1 M KSCN solution having pH 1. The formation and conservation of $(SNC^-)_2$ radical was measured as a function of time.

With $TiO_2$ prepared as in example 8, $(SNC^-)_2$ radical formed at least up to 100 ps (formation life 158.9 ps) and a considerable amount still remained at 1 ns. The results showed that the transfer of the gap to SNC is considerably more efficient with the product of the invention than with other products, and hence they have higher photocatalytic activity.

The comparison comprised the products of examples 16 and 18, whose sulphur concentration and specific areas and also life values of the $(SNC^-)_2$ radical obtained in femtosecond measurements differed from the values of the invention. With the products of examples 16 and 18, the $(SNC^-)_2$ radical formed rapidly and subsequently began to disappear. At 1 ns, the radial was hardly observed.

3. Cleaning of Aquarium Water

The inner filter of aquarium water was removed from an operating 40-liter aquarium, which had a distinct algal deposit on the walls and called for cleaning. The filter elements of the filter were rinsed with about 500 ml of water. A green solution containing algae was obtained.

A 50 ml sample of this solution was taken into a 70 ml beaker. The A solution was a comparative solution. 10 mg of TiO2 prepared as in example 1 was added into the B and C solutions and was stirred. Solutions A and B were stirred for 30 min. Solution C was exposed with an 8 W mercury discharge lamp having an intensity of about 1100 W/cm2 and placed at a distance of 17 cm from the solution. The exposure period was 30 min.

Clarification of the aquarium water was observed for solution C, but not for solutions A and B.

The invention claimed is:

1. A method for preparing a photocatalyst containing titanium dioxide, characterised in that from an acid solution containing titanium oxysulphate at a temperature under the boiling point of the solution is precipitated by addition of crystal nuclei a sulphurous titanium dioxide hydrate precipitate, said precipitate being separated and subsequently subjected to thermal treatment in order to obtain a crystalline product with a sulphur content of 1 to 5 w%;

and wherein the precipitation is conducted without addition of base in a temperature range from 70 to 100° C. and the precipitate separated from the solution is calcinated in air in the temperature range from 100 to 500° C.

2. A method as defined in claim 1, characterised in that the crystal nuclei are anatase.

3. A method as defined in claim 1, characterised in that the solution containing titanium oxysulphate is obtained by reacting ilmenite and sulphuric acid, by dissolving the sulphate thus formed and by removing at least part of the iron from the solution by reduction into ferrous form and crystallisation.

4. A method as defined in claim 3, characterised in that ferric iron is left in the solution, so that the titanium dioxide hydrate precipitate obtained contains iron.

5. A method as defined in claim 1, characterised in that a chromium (III) compound is added to the precipitate before the thermal treatment.

6. A method as defined in claim 1, characterised in that an iron compound is added to the precipitate before the thermal treatment.

7. A photocatalyst obtained by a method according to claim 1, the photocatalyst containing titanium dioxide, characterised in that the crystalline particulate product has a specific surface area in the range from 100 to 250 $m^2$/g and that the product contains 1 to 5 w% of sulphur.

8. A photocatalyst as defined in claim 7, characterised in that the major portion of titanium dioxide is in anatase form.

9. A photocatalyst as defined in claim 1, characterised in that the product contains 0.05 to 2 w% of chromium, and 0.05 to 0.3w% of iron.

10. A method for photocatalysting a reaction, comprising adding a titanium dioxide prepared as in claim 1 into a reaction mixture and directing visible wavelengths to the photocatalyst for exciting the photocatalyst.

11. A method for photocaialysing the decomposition reaction of a organic compounds and microorganisms, comprising adding a titanium dioxide prepared as in claim 1 into a reaction mixture containing organic compounds or microorganisms and directing light to the photocatalyst for exciting the photocatalyst.

12. A coating composition comprising titanium dioxide photocatalyst prepared as in claim 1.

* * * * *